United States Patent [19]
Kang

[11] Patent Number: 5,442,506
[45] Date of Patent: Aug. 15, 1995

[54] HEAD DRUM GROUND SYSTEM HAVING A RESILIENTLY MOUNTED CONDUCTIVE BRUSH

[75] Inventor: Dong-Ho Kang, Seoul, Rep. of Korea

[73] Assignee: Daewoo Electronics Co., Ltd., Seoul, Rep. of Korea

[21] Appl. No.: 231,605

[22] Filed: Apr. 22, 1994

[30] Foreign Application Priority Data

May 31, 1993 [KR] Rep. of Korea ............... 1993-9701

[51] Int. Cl.⁶ .................. G11B 5/52; G11B 5/40; G11B 33/14; H05S 1/00
[52] U.S. Cl. ..................... 360/107; 360/84; 360/128; 360/137; 361/220; 361/212
[58] Field of Search ........... 360/107, 84, 130.24, 360/130.23, 130.22, 128, 137; 361/212, 220, 221

[56] References Cited

U.S. PATENT DOCUMENTS

| | | | |
|---|---|---|---|
| 4,623,944 | 11/1986 | Yamashita | 360/84 |
| 5,113,298 | 5/1992 | Fukushima et al. | 360/130.22 |
| 5,119,257 | 6/1992 | Itou et al. | 360/130.22 |

Primary Examiner—John H. Wolff
Assistant Examiner—Craig A. Renner
Attorney, Agent, or Firm—Anderson Kill Olick & Oshinsky

[57] ABSTRACT

A head drum ground system for use with a VCR comprises an electrical coupler which is located and arranged in an inner space of the head drum assembly so that a rotary drum is electrically connected with a stationary drum within the VCR. As a result, static electricity occurring on the surface of the rotary drum is transmitted to a deck supporting the stationary drum, through a boss member, the electrical coupler, an outer ring of a bearing, and the stationary drum, in that order.

3 Claims, 2 Drawing Sheets

HEAD DRUM GROUND SYSTEM HAVING A RESILIENTLY MOUNTED CONDUCTIVE BRUSH

FIELD OF THE INVENTION

The present invention is directed to a grounding system of a head drum assembly; and, more particularly, to an improved grounding system for removing static electricity generated from a rotational drum in a head drum assembly.

DESCRIPTION OF THE PRIOR ART

A video cassette recorder, normally referred to as "VCR" by its acronym, having a head drum assembly which consists of a rotary drum and a stationary drum, includes a grounding system for removing static electricity from the rotary drum in the head drum assembly. The static electricity generated between the rotating drum and a magnetic tape thereon may create noises in a signal to be reproduced or recorded Therefore, in order to remove the static electricity from the rotary drum, the ground system is needed, which electrically connects the rotary drum to a deck or the main chassis.

One of the prior art ground systems of the head drum assembly is disclosed in U.S. Pat. No. 4,623,944 issued to T. Yamashita, which utilizes a cylindrical member including a tongue and a contactor, said tongue causing the contactor to be slidingly contacted with a rotating shaft. However, it is seen that the complicated structure of said cylindrical member tends to invite difficulties in manufacturing the same. Moreover, since the cylindrical member is supposed to hold onto a stationary drum by its own resilient force alone, all parts of the cylindrical member should be made of a resilient material. That is, not only the biasing means, i.e., the tongue, but also the remainder of the cylindrical member should be made of a resilient material so that the cylindrical member be kept on the stationary drum. Therefore, such structural of the cylindrical member may entail an increased manufacturing cost or material requirement of the ground system.

Another prior art ground system is illustrated in FIG. 1, together with its head drum assembly. As shown in FIG. 1, this ground system 1 is provided with an extra bracket 2 mounted on a deck 6, a leaf spring 3 secured to the extra bracket 2, and a conductive brush 4 depressed against a rotating shaft 7 by the leaf spring 3. Said ground system 1 is further provided with a rubber member 5 attached to an upper surface of the leaf spring 3, said rubber member 5 together with the leaf spring 3 more resiliently urging the brush 4 toward the shaft 7.

These components constitute an electric circuit so that the static electricity may be transmitted to the deck 6, from the rotating drum 9. However, since said prior art ground system 1 is positioned at the outside of the head drum assembly 10A, it needs an extra space around the deck 6. Particularly, the increased number of components may cause the manufacturing process of the ground system to be more cumbersome and costly.

SUMMARY OF THE INVENTION

It is, therefore, an object of the invention to provide an improved ground system of a head drum assembly which is capable of reducing the number of its components and the space requirement.

Another object of the invention is to provide a ground system having a more simplified structure to thereby facilitate the manufacturing process thereof by way of eliminating the need to employ any separate member for supporting the biasing means.

In accordance with the present invention, an electrical coupler is utilized so that static electricity generated from a rotating drum be transmitted to a deck through a stationary drum. The electrical coupler consists of a conductive brush and biasing means, said biasing means, retained in a blind hole of the rotating drum, depressing the conductive brush against an outer ring of a bearing in order to connect the brush with the stationary drum supporting the bearing. In a first embodiment of the present invention, said biasing means of the electrical coupler is made of a coil spring, while a leaf spring may be utilized in a second embodiment in accordance with the present invention.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
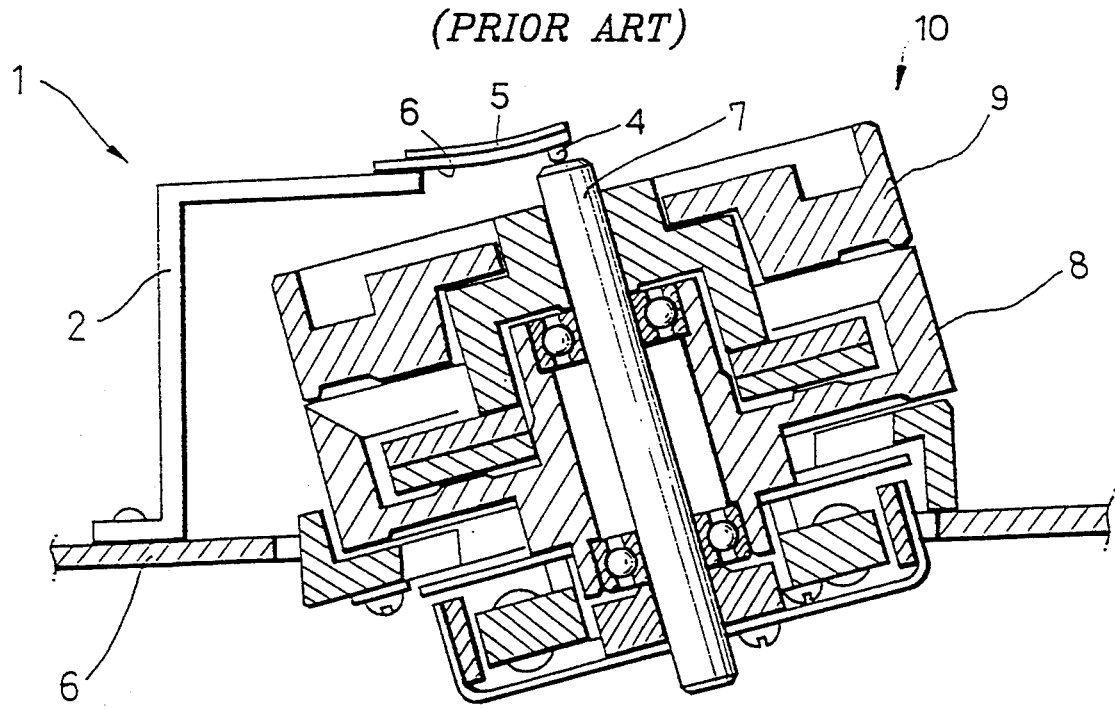
FIG. 1 is a longitudinal sectional view of a head drum assembly incorporating one of the prior art ground systems.
Figure 2:
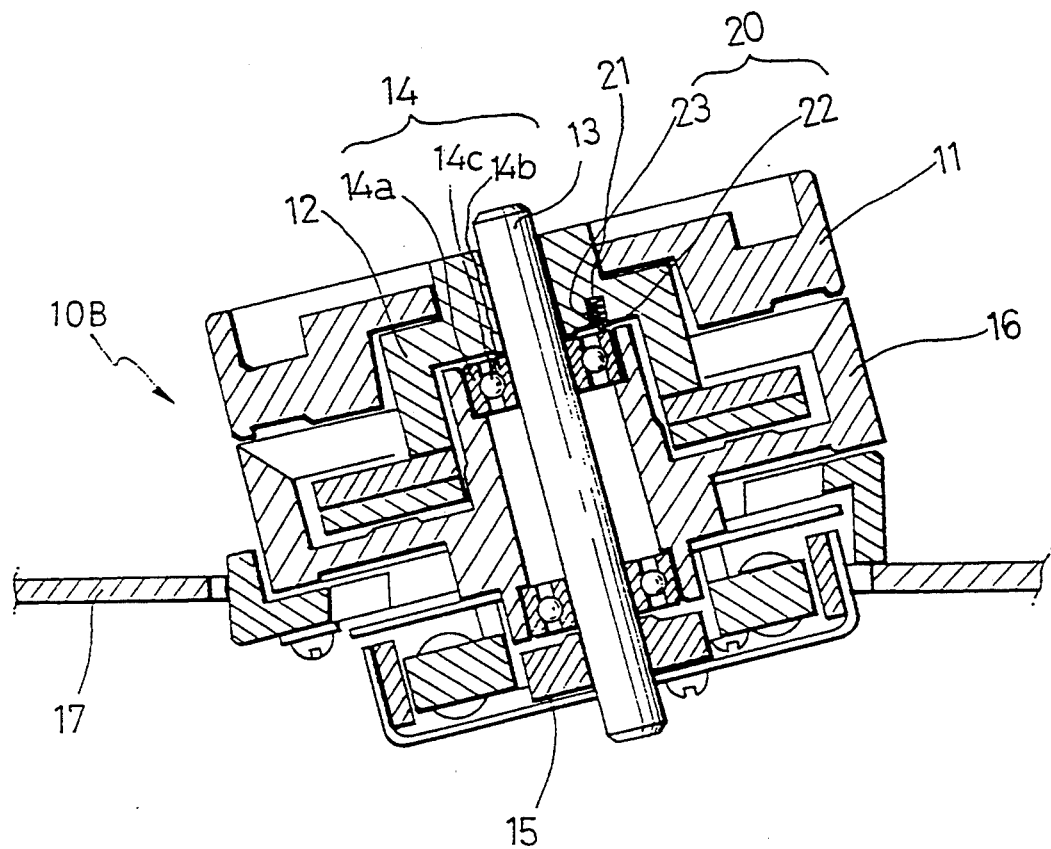
FIG. 2 represents a longitudinal sectional view of a head drum assembly including the first embodiment of the ground system in accordance with the present invention.

Referring first to FIG. 2, there is shown a head drum assembly 10B including a ground system according to the first embodiment of the present invention. As shown, the head drum assembly 10B is provided with a rotational drum 11 supported by a boss member 12, and a stationary drum 16 fixed on a deck 17 to establish an electrical connection therebetween.

A rotating shaft 13 closely fitted into the boss member 12 is rotatably supported by a pair of radial bearings which are located at both ends of the stationary drum 16, respectively. Each bearing includes an outer ring 14a, an inner ring 14b and balls 14c running in curvilinear grooves formed between the rings 14a and 14b, while said balls 14c are supplied with an lubricating oil thereon which is to insulate the inner ring 14b from the outer ring 14a or vice versa.

Further, an electrical coupler 20 for connecting the boss number 12 to the outer ring 14a of the bearing 14 is installed in an inner space of the head drum assembly 10B, causing the rotational head drum 11 to be electrically connected to the deck 17.

Figure 3:
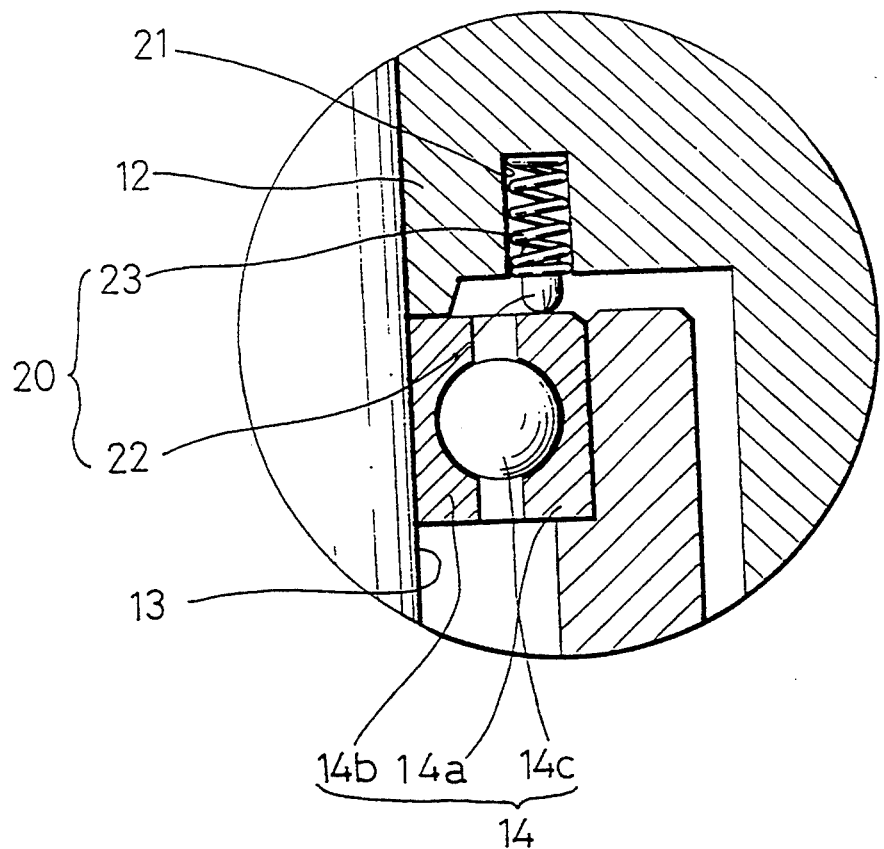
FIG. 3 offers an enlarged view of the ground system of the head drum assembly shown in FIG. 2.

Turning now to FIG. 3, there is shown, on an enlarged scale, the electrical coupler 20 employed in the ground system according to the first embodiment of the invention. As shown, the electrical coupler 20 consists of a conductive brush 22 which usually comes into contact with the outer ring 14a, and a coil spring 23 retained in a blind hole 21 of the boss member 12. Said coil spring 23 resiliently depresses the conductive brush 22 toward the outer ring 14a of the radial bearing 14.

In accordance with the illustrated embodiment of the ground system shown in FIGS. 2 and 3, when the static electricity appears on the surface of the rotating drum 11, it is transmitted to the deck 17 through the boss member 12, the electrical coupler 20, the outer ring 14a of the bearing 14, and the stationary drum 16, in that order.

Figure 4:
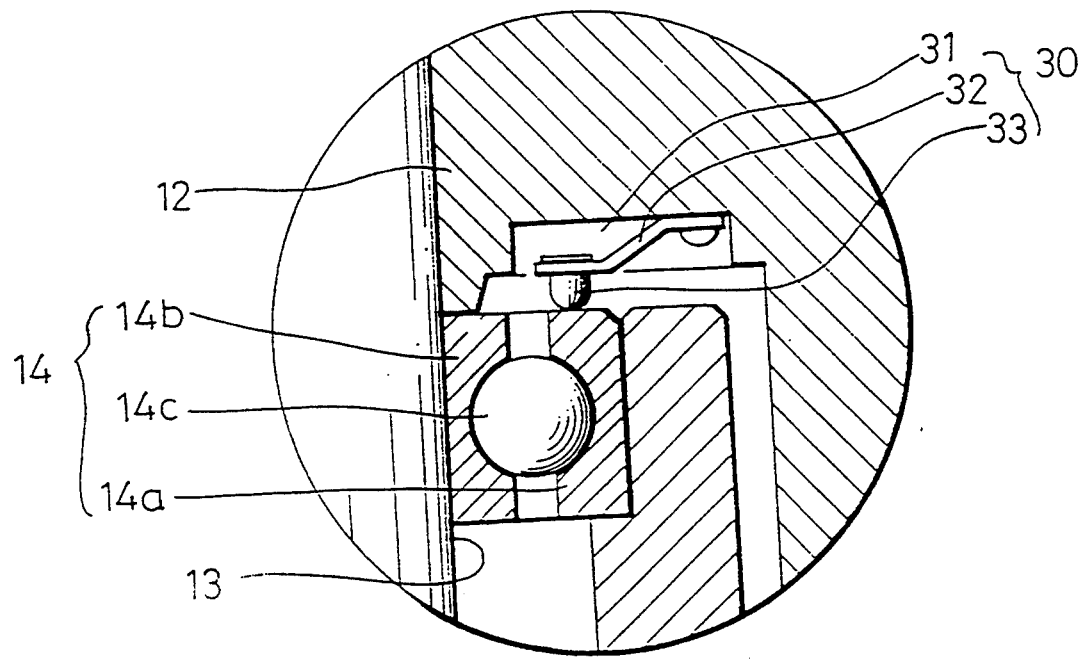
FIG. 4 presents an expanded view of the second embodiment of the ground system in accordance with the present invention.

The second embodiment of the ground system, as enlarged, is depicted in FIG. 4. The second embodiment includes a different electrical coupler 30 which consists of a leaf spring 32 and a conductive brush 33, and a widened blind hole 31 as compared with the first embodiment shown in FIG. 3. As depicted, one end of the leaf spring 32 is secured into the blind hole 31 of the boss member 12, while the other end elastically urges the conductive brush 33 against the outer ring 14a of the radial bearing 14. It will be also apparent that the electrical coupler 30 has the same function as the coupler 20 illustrated in FIG. 3.

In the preferred embodiments of the invention, the conductive brush of the electrical coupler is formed of a conductive material; however, the biasing means of the coupler is preferably formed of a conductive and resilient material.

Although the invention has been shown and described with respect to the preferred embodiments, it will be understood by those skilled in the art that various changes and modifications may be made without departing from the spirit and scope of the invention as defined in the following claims.

What is claimed is:

1. In a video cassette recorder provided with a ground system for discharging static electricity generated from a head drum assembly therein which includes a rotary drum having a rotating shaft rotatably supported by at least one bearing, and a stationary drum mounted on a deck within the video cassette recorder, said ground system comprising:

a boss member, having a blind hole, closely fitted into the rotary drum and rotating together with the rotating shaft; and an electrical coupler consisting of a conductive brush and biasing means, said biasing means being retained in the blind hole of the boss member while resiliently depressing the conductive brush against an outer ring of the bearing.

2. The video cassette recorder as recited in claim 1, wherein said biasing means is made of a coil spring.

3. The video cassette recorder as recited in claim 1, wherein said biasing means is made of a leaf spring.

* * * * *